Patented May 30, 1939

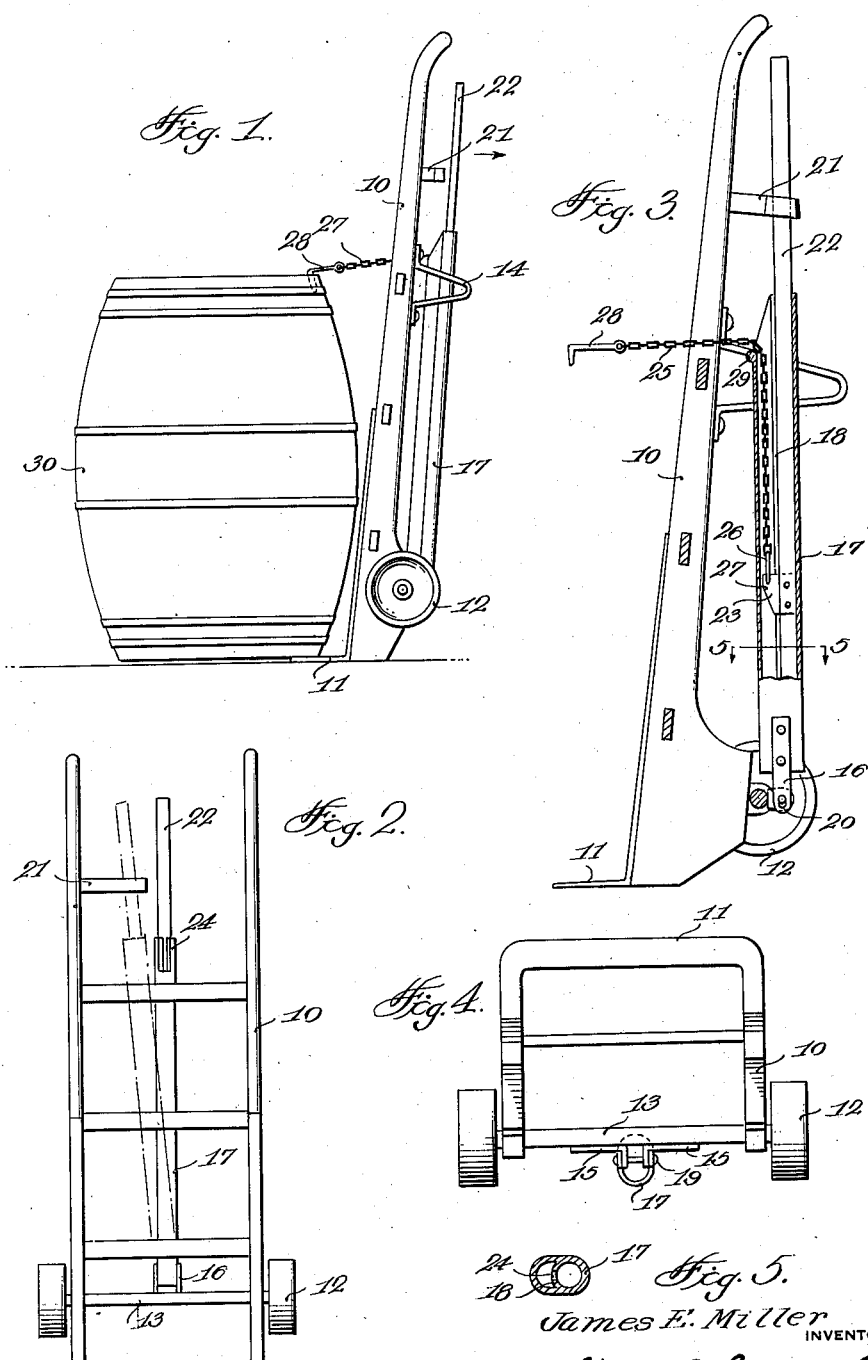

2,160,556

UNITED STATES PATENT OFFICE 2,160,556

HAND TRUCK

James E. Miller, Sherman, Tex.

Application August 5, 1938, Serial No. 223,355

1 Claim. (Cl. 214—65.4)

This invention relates to hand trucks and has for an object to provide a hand truck having novel means for tilting a barrel, packing case, or other heavy object on to the blade of the truck.

Ordinarily when a workman is loading a heavy barrel on a hand truck he first puts the truck blade underneath the barrel. Then he must bend over the truck and the barrel to tilt the barrel back on to the truck. In doing this he is thrown off balance and oftentimes is unable to tilt the barrel on to the truck so that the service of an additional workman is needed.

With the above in mind, a further object of the present invention is to provide a hand truck having a heavy article tilting device which can be operated easily by one workman.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification:

Figure 1 is a side elevation of a hand truck equipped with a barrel tilting device constructed in accordance with the invention.

Figure 2 is a longitudinal sectional view of the hand truck and tilting device shown in Figure 1.

Figure 3 is a front elevation of the hand truck and tilting device.

Figure 4 is a bottom plan view of the truck and tilting device.

Figure 5 is a detail cross sectional view taken on the line 5—5 of Figure 3 showing the housing having separate compartments for the lever and chain.

Referring now to the drawing in which like characters of reference designate similar parts in the various views, 10 designates the frame, 11 the blade, 12 the wheels, 13 the axle housing, and 14 the legs of a conventional hand truck.

In carrying out the invention, a pair of angular brackets 15 are secured to the rear side of the axle housing 13, hinge ears 16 which project downwardly forming a housing 17 having a division wall 18 therein forming a two compartment housing. A pivot pin 19 is passed through the hinge ears 16 and through the angular brackets 15 to hingedly mount the housing to swing toward and away from the truck frame 10 on the rear side thereof. The pivot pin 19 is received in slots 20 in the hinge ears 16 to permit the housing being also swung laterally as indicated by dotted lines in Figure 2 to be received in a hook-like keeper 21 carried by the truck frame, when not in use.

A lever 22 is slidably and non-rotatably mounted in one compartment of the housing 17 and is provided with a lug 23 which projects through a longitudinal slot 24 in the division wall 18, best shown in Figure 4.

A chain 25 is provided at one end with a hook 26 which is engaged through an opening 27 in the web 23. The chain is of sufficient length to extend to the top of the respective compartment of the housing in which it is concealed and is provided at the free end with a hook 28.

The chain is withdrawn from its compartment over a bead 29 at the top front side of the compartment when the lever 22 is pulled upwardly by the operator so that the hook 28 may be engaged with the top of the barrel, for example, after the blade 11 of the truck has been inserted underneath the barrel. Thereupon the operator may rock the lever 22 rearwardly in the direction of the arrowhead shown in Figure 1 to tilt the barrel on the blade toward and against the truck frame 10 and when this is done the operator may lower the handles of the truck frame until the wheels 12 touch the floor or ground, as is customary to transport the barrel 30.

It will be pointed out that by raising or lowering the handle 22 the length of the chain 25 projecting from the housing may be increased or diminished to accommodate various sizes and shapes of containers.

From the above description it is thought that the construction and operation of the invention will be fully understood without further explanation.

What is claimed is:

The combination with a hand truck having a frame, a lip, a wheeled axle, and a housing for the axle, of a two compartment housing, a pivotal connection between the lower end of the housing and the axle housing permitting of the housing being swung forwardly and rearwardly of the frame, as well as laterally of the frame, a keeper carried by the frame for securing the housing in the laterally swung released position, a web in the housing dividing the housing into separate compartments, a handle in one compartment, said web having a longitudinal slot therein, a tongue on the lower end of the handle projecting through said slot into the other compartment, a flexible member in said other compartment connected at one end to said tongue, and a hook on the free end of said flexible member for engaging a container and tilting the same upon the lip of the truck when said handle is swung rearwardly on its pivot relatively to the frame.

JAMES E. MILLER.